(12) United States Patent
Kroger

(10) Patent No.: US 8,710,687 B2
(45) Date of Patent: Apr. 29, 2014

(54) WIND TURBINE

(75) Inventor: Uwe Kroger, Osteel (DE)

(73) Assignee: EES GmbH, Wiesmoor (DE)

( * ) Notice: Subject to any disclaimer, the term of this patent is extended or adjusted under 35 U.S.C. 154(b) by 90 days.

(21) Appl. No.: 13/509,559

(22) PCT Filed: Oct. 20, 2010

(86) PCT No.: PCT/DE2010/001242
§ 371 (c)(1),
(2), (4) Date: Jul. 13, 2012

(87) PCT Pub. No.: WO2011/057598
PCT Pub. Date: May 19, 2011

(65) Prior Publication Data
US 2012/0274075 A1    Nov. 1, 2012

(30) Foreign Application Priority Data
Nov. 11, 2009    (DE) .......................... 10 2009 052 493

(51) Int. Cl.
*F03D 9/00*    (2006.01)
*H02P 9/04*    (2006.01)

(52) U.S. Cl.
USPC ............................................... 290/44; 290/55

(58) Field of Classification Search
USPC ..................................................... 290/44, 55
See application file for complete search history.

(56) References Cited

U.S. PATENT DOCUMENTS

| 4,513,206 | A | * | 4/1985 | Gervasio et al. | 290/4 C |
| 4,556,801 | A |   | 12/1985 | Gervasio et al. | |
| 4,684,813 | A | * | 8/1987 | Watson | 290/4 A |
| 2007/0166147 | A1 |   | 7/2007 | Merswolke et al. | |
| 2011/0076144 | A1 | * | 3/2011 | Lucas | 416/79 |
| 2011/0278858 | A1 | * | 11/2011 | Hehenberger | 290/1 C |

FOREIGN PATENT DOCUMENTS

EP    0 120 654 A1    10/1984

* cited by examiner

*Primary Examiner* — Tulsidas C Patel
*Assistant Examiner* — Thomas Quigley
(74) *Attorney, Agent, or Firm* — Muncy, Geissler, Olds & Lowe, P.C.

(57) ABSTRACT

In the case of a wind power installation with at least one wind turbine and one current generator device, the current generator device has at least two generators. The generators are coupled to one another via at least one differential gear unit, the wind turbine being arranged on a balancing gear of the differential gear unit. The rotors of the generators are in each case connected to an axial gear of the differential gear unit, the stators of the generators being connected to one another to form an abutment on which the differential carrier of the differential gear unit is accommodated such that it can rotate.

5 Claims, 1 Drawing Sheet

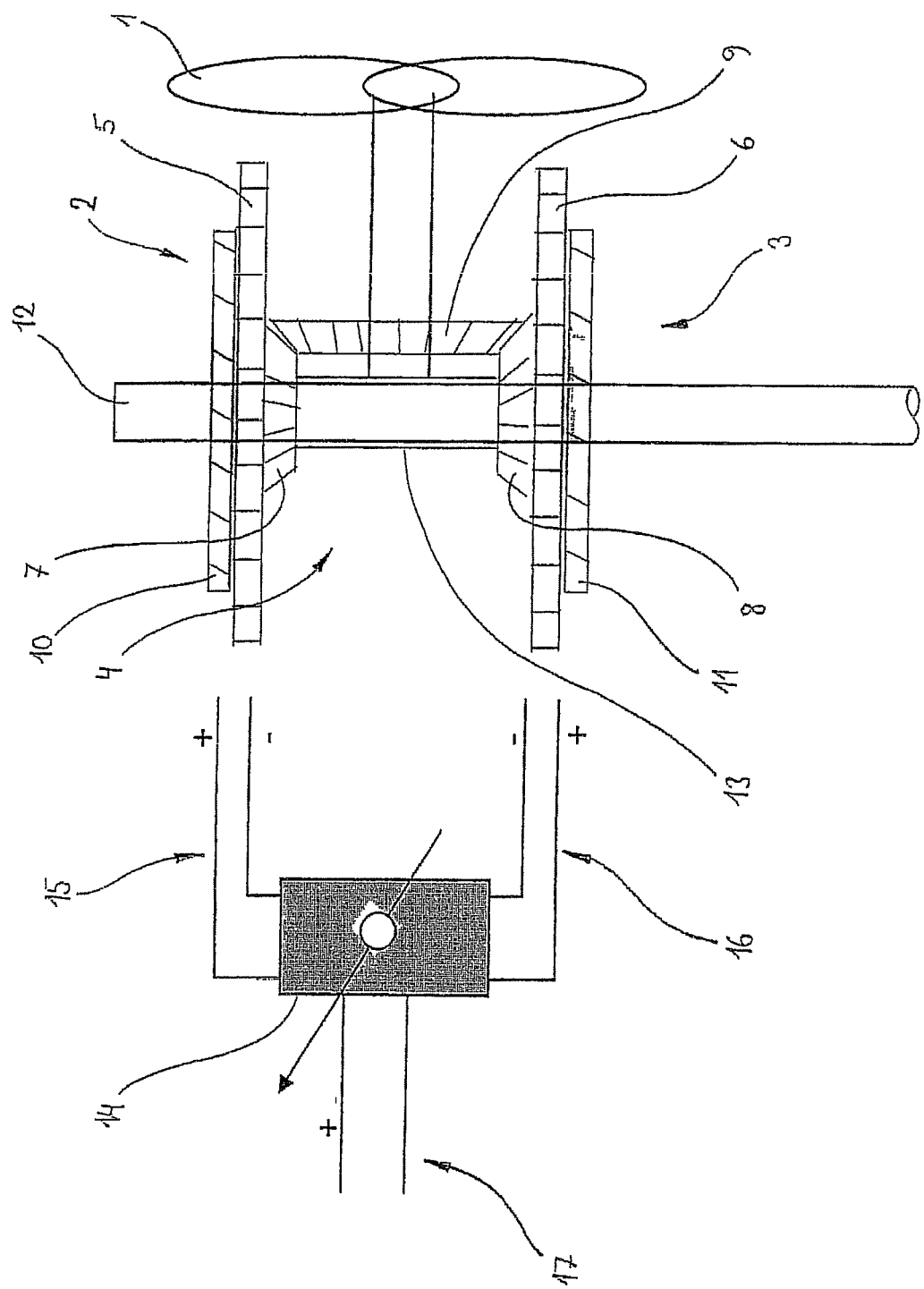

WIND TURBINE

The invention relates to a wind power installation with at least one wind turbine and an electric current generator device.

In known wind power installations, wind tracking takes place via control motors with which the entire gondola head of the wind power installation is rotated about a vertical axis by means of a so-called azimuth bearing. Rotational speed regulation preferably takes place via control motors, using which the blade angle of attack of the wind turbine are adjusted. All control motors receive their control signals from a control apparatus which has wind measuring apparatuses which are arranged on the gondola head. The free arrangement on the gondola head has the disadvantage however, that the wind measuring apparatuses are continually exposed to weather conditions. Disturbances caused by ice formation and corrosion in particular may mean that the wind measuring apparatuses no longer work or can only work in a limited capacity. In addition, the wind measuring apparatuses are exposed to disturbances which are for example caused by inconsistent wind conditions. To compensate these disturbances and also for controlling the control motors, there is a requirement for complex open-loop and closed-loop control loops. In particular, when implementing smaller wind power installations with a power of up to 30 kilowatts, the complex open-loop and closed-loop control technology substantially constitute a clear investment risk.

The invention is therefore based on the object of specifying a wind power installation of the generic type mentioned at the beginning, the wind tracking and rotational speed regulation of which are substantially simplified.

This object is achieved according to the invention by means of the features of Patent Claim 1. Advantageous developments of the invention are specified in the dependent claims.

The wind power installation according to the invention stands out on account of the fact that the current generator device has at least two generators, that the generators are coupled to one another via at least one differential gear unit, that the rotors of the generators are in each case connected to an axial gear of the differential gear unit, that the wind turbine is arranged on a balancing gear of the differential gear unit, and that the stators of the generators are connected to one another to form an abutment on which the differential carrier of the differential gear unit is accommodated such that it can rotate.

Like any differential gear unit, the differential gear unit of the wind power installation according to the invention also has a differential carrier, with which each balancing gear is held in an engaging position with both axial gears. In addition to its actual task to divide a torque in halves to the axial gears, the balancing gear additionally takes on the function of a drive gear connected to the wind turbine for the differential gear unit of the wind power installation according to the invention. Consequently, the generators assigned to the axial gears are driven with mutually opposed directions of rotation. With respect to the axial differential of a motor vehicle, the rotors of the generators correspond to the axial shafts of a drive axle. The differential carrier, which is driven by the drive shaft of a gear unit in the case of axial differentials of motor vehicles, takes on the balancing function of the balancing gear used in axial differentials in the case of the wind power installation according to the invention. Whilst with the axial differentials used in the case of motor vehicles, rotational speed differences arising at the axial shafts of a drive shaft due to cornering are balanced by the balancing gear, in the case of the differential gear unit of the wind power installation according to the invention, torque differences arising at the axial gears are to be balanced by the differential carrier. In this case, torque differences are either the consequence of oblique incident flow of the wind turbine in the case of a wind direction change or else the different torques are the consequence of an uneven resistance to the counterrotating generators of the current generator device. A rotary bearing required on the abutment for the rotary accommodation of the differential carrier can advantageously be realised in a markedly smaller and more cost-effective manner than an azimuth bearing of a known wind power installation with comparable power.

According to a first development of the invention, the generators are constructed to form ring generators, the abutment of which, which is formed by the stators, has at least one hollow shaft functioning as a line carrier. With the hollow shaft, a routing for an electric coupling of the counterrotating generators is advantageously created.

According to a next development of the invention, each generator has a rotational axis orientated approximately at right angles to the rotational axis of the wind turbine. To this end, the differential gear unit is advantageously constructed as a bevel differential gear unit. It lies completely within the scope of the invention, however, to arrange the rotational axes of the generators and the wind turbine parallel to one another. To this end, the differential gear unit is advantageously constructed as a spur differential gear unit.

According to a particularly advantageous development of the invention, the generators are connected to one another via at least one current collection regulator. With the current collection regulator, different resistances can be set inductively at the generators, so that the torque difference then set is balanced by the differential carrier by means of an automatic rotational movement at the abutment thereof and the wind turbine rotates out of the wind by a predefined angle. In this manner, a cost-effective and nonetheless effective rotational speed regulation is formed. Expensive control motors and also complicated open-loop and closed-loop control loops can advantageously be dispensed with.

To construct a mechanically simple and cost-effective wind tracking, provision is made to construct the wind turbine as a downwind rotor so that the wind turbine orientates itself in the wind automatically. Expensive control motors and also complex open-loop and closed-loop control loops can here likewise be dispensed with. Of course, it is likewise conceivable to construct the wind turbine as an upwind rotor with a wind vane arranged on the differential carrier, which keeps the upwind rotor in the wind in a comparatively simple manner. Also, the additional arrangement of an upwind rotor opposite the downstream rotor and also the construction of a differential gear unit with a plurality of balancing gears lie within the scope of the invention.

An exemplary embodiment of the invention, from which further features of the invention arise, is illustrated in the drawing.

The FIGURE shows a schematic illustration of the wind power installation according to the invention with a wind turbine 1 and two generators 2, 3 constructed as ring generators, which are mechanically coupled to one another via a differential gear unit 4. The counterrotating rotors 5, 6 of the generators 2, 3 are in each case connected to an axial gear 7, 8 of the differential gear unit 4, the wind turbine 1 being arranged on a balancing gear 9 of the differential gear unit 4. The stators 10, 11 of the generators 2, 3 are connected to one another via a hollow shaft 12 to form an abutment, on which the differential carrier 13 of the differential gear unit 4 is accommodated such that it can rotate. Each generator 2, 3 has a rotational axis orientated at right angles to the rotational axis of the wind turbine 1 constructed as a downwind rotor. The generators 2, 3 are electrically connected to one another via a current collection regulator 14. For this connection, electrical generator connection lines 15, 16 are routed through the hollow shaft 12 functioning as line carrier (not illustrated). Additionally, the current collection regulator 14 has network connection lines 17 for outputting the electric current supplied by the generators 2, 3 to a supply network.

The invention claimed is:

1. A wind power installation with at least on wind turbine an a current generator device,
   wherein the current generator device has at least two generators,
   the generators are couples to one another via at least one differential gear unit,
   the rotors of the generators are in each case connected to an axial gear of the differential gear unit,
   the wind turbine is arranged on a balancing gear of the differential gear unit, and
   the stators of the generators are connected to one another to form an abutment on which a differential carrier of the differential gear unit is accommodated such that it can rotate.

2. The wind power installation according to claim 1, wherein the generators are constructed to form ring generators, the abutment of which is formed by the stators and has at least one hollow shaft functioning as a line carrier.

3. The wind power installation according to claim 1, wherein each generator has a rotational axis orientated approximately at right angles to the rotational axis of the wind turbine.

4. The wind power installation according to one of claim 1, wherein the generators are electrically connected to one another via a current collection regulator.

5. The wind power installation according to one of claim 1, wherein the wind turbine is constructed as a downwind rotor.

* * * * *